(12) United States Patent
Burt et al.

(10) Patent No.: US 11,390,391 B2
(45) Date of Patent: Jul. 19, 2022

(54) EVACUEE-CENTERING EVACUATION SLIDE

(71) Applicant: GOODRICH CORPORATION, Charlotte, NC (US)

(72) Inventors: Rachel Burt, Tempe, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 308 days.

(21) Appl. No.: 16/823,630

(22) Filed: Mar. 19, 2020

(65) Prior Publication Data
US 2021/0291993 A1   Sep. 23, 2021

(51) Int. Cl.
*B64D 25/14* (2006.01)

(52) U.S. Cl.
CPC ................... *B64D 25/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,092,232 A * | 6/1963 | Adams, Jr. | ............... | A62B 1/20 193/25 B |
| 3,771,749 A * | 11/1973 | Smialowicz | ........... | B64D 25/14 244/905 |
| 3,973,645 A * | 8/1976 | Dix | ........ | B64D 25/14 193/25 B |
| 4,444,290 A * | 4/1984 | Valerio, Jr. | ............. | A62B 1/20 193/25 B |
| 4,671,975 A * | 6/1987 | Smialowicz | ........... | B64D 25/14 428/323 |
| 4,684,079 A * | 8/1987 | Miller | ................... | B64D 25/14 193/25 B |
| 5,875,868 A * | 3/1999 | Smialowicz | ........... | B64D 25/14 193/25 B |
| 6,471,001 B1 * | 10/2002 | Baker | .................... | B64D 25/14 182/48 |
| 6,799,741 B2 | 10/2004 | Danielson et al. | | |
| 6,877,696 B2 * | 4/2005 | Moro | .................... | B64D 25/14 193/25 B |
| 9,809,316 B2 * | 11/2017 | Hartman | ................ | B64D 25/14 |
| 2003/0234323 A1 * | 12/2003 | Danielson | .............. | B64D 25/14 244/137.2 |
| 2005/0115794 A1 * | 6/2005 | Zonneveld | ............. | B64D 25/14 182/48 |

* cited by examiner

*Primary Examiner* — Hai Phan
*Assistant Examiner* — Son M Tang
(74) *Attorney, Agent, or Firm* — Snell & Wilmer L.L.P.

(57) ABSTRACT

An evacuation slide may comprise a sliding surface and an inflatable tube assembly located opposite the sliding surface. The inflatable tube assembly may be configured to direct an evacuee toward a lateral center of the sliding surface. The inflatable tube assembly may include a pair of funnel tubes extending from the sides of the slide toward the lateral center of the slide.

16 Claims, 6 Drawing Sheets

EVACUEE-CENTERING EVACUATION SLIDE

FIELD

The present disclosure relates to aircraft evacuation systems and, in particular, to an evacuee-centering evacuation slide.

BACKGROUND

Emergency evacuation systems, including inflatable evacuation slides, may be used to exit an aircraft absent a jet way or other suitable means of egress for passengers. The evacuation slides may deploy, for example, from the side of an exit door located along the aircraft fuselage. In the event of a water landing, the inflatable evacuation slide may be employed as a life raft. As set forth by various governmental agencies, width and/or capacity requirements for when the slide is in "raft-mode" may lead to single lane slides having an increased width. For example, some single lane slides may be formed having a width similar to the width of a double lane slide, due the capacity requirements for when the slide is in raft-mode. Asymmetric loading can occur when evacuees slide near a side, as opposed to a middle, of wider slides. To accommodate the asymmetric loading and/or to reduce a probability the slide will buckle, various reinforcements (e.g., transverse support tubes, longitudinal support tubes, greater diameter rails, etc.) may be employed. The reinforcements tend to increase the amount of fabric associated with forming the slide and/or a weight of the evacuation system.

SUMMARY

An evacuation slide is disclosed herein. In accordance with various embodiments, the evacuation slide may comprise a first inflatable tube assembly and a second inflatable tube assembly adjacent to the first inflatable tube assembly. The first inflatable tube assembly may include a first upper longitudinal tube and a second upper longitudinal tube. The second inflatable tube assembly may include a first lower longitudinal tube, a second lower longitudinal tube, a head end tube, a toe end tube extending between the first lower longitudinal tube and the second lower longitudinal tube, a first funnel tube extending from the first lower longitudinal tube to the toe end tube, and a second funnel tube extending from the second lower longitudinal tube to the toe end tube.

In various embodiments, a first end of the first funnel tube may be located closer to the head end tube than to the toe end tube. In various embodiments, a first end of the first funnel tube may be between a buckling point of the first lower longitudinal tube and the head end tube. In various embodiments, the first end of the first funnel tube may be located at a midpoint between the buckling point of the first lower longitudinal tube and the head end tube.

In various embodiments, a first end of the first funnel tube may be connected to the first lower longitudinal tube and a second end the first funnel tube may be located closer to a lateral center of a sliding surface of the evacuation slide as compared to the first end of the first funnel tube.

In various embodiments, a first end of the second funnel tube may be connected to the second lower longitudinal tube and a second end of the second funnel tube may be located closer to the lateral center of the sliding surface as compared to the first end of the second funnel tube.

In various embodiments, the first funnel tube and the second funnel tube may be configured to create raised areas in the sliding surface.

An evacuation system is also disclosed herein. In accordance with various embodiments, the evacuation system may comprise a fluid source and an evacuation slide fluidly coupled to the fluid source. The evacuation slide may comprise a first inflatable tube assembly fluidly coupled to the fluid source and a second inflatable tube assembly fluidly coupled to the fluid source. The first inflatable tube assembly may include a first upper longitudinal tube and a second upper longitudinal tube. The second inflatable tube assembly may include a first lower longitudinal tube, a second lower longitudinal tube, a head end tube, a toe end tube, a first funnel tube extending from the first lower longitudinal tube to the toe end tube, and a second funnel tube extending from the second lower longitudinal tube to the toe end tube.

In various embodiments, a first end of the first funnel tube may be connected to the first lower longitudinal tube and a second end the first funnel tube may be located closer to a lateral center of a sliding surface of the evacuation slide as compared to the first end of the first funnel tube.

In various embodiments, a first end of the second funnel tube may be connected to the second lower longitudinal tube and a second end of the second funnel tube may be located closer to the lateral center of the sliding surface as compared to the first end of the second funnel tube.

In various embodiments, the first end of the first funnel tube may be located between a first buckling point of the first lower longitudinal tube and the head end tube, and the first end of the second funnel tube may be located between a second buckling point of the second lower longitudinal tube and the head end tube.

In various embodiments, the first end of the first funnel tube may be located at a midpoint between the first buckling point of the first lower longitudinal tube and the head end tube, and wherein the first end of the second funnel tube may be located at a midpoint between the second buckling point of the second lower longitudinal tube and the head end tube.

In various embodiments, the first end of the first funnel tube may be located between a midpoint of the first lower longitudinal tube and the head end tube, and the first end of the second funnel tube may be located between a midpoint of the second lower longitudinal tube and the head end tube.

In various embodiments, a first portion of the sliding surface located over the first funnel tube and a second portion of the sliding surface located over the second funnel tube are raised with respect to a portion of the sliding surface located at the lateral center of the sliding surface.

An evacuation slide, in accordance with various embodiments, may comprise a sliding surface and an inflatable tube assembly located opposite the sliding surface. The inflatable tube assembly may be configured to direct an evacuee toward a lateral center of the sliding surface.

In various embodiments, the inflatable tube assembly may comprise a first funnel tube having a first end and a second end opposite the first end of the first funnel tube. The first end of the first funnel tube may be located closer to a head end of the sliding surface as compared to the second end of the first funnel tube. The second end of the first funnel tube may be located closer to the lateral center of the sliding surface as compared to the first end of the first funnel tube.

In various embodiments, the inflatable tube assembly may comprise a second funnel tube having a first end and a second end opposite the first end of the second funnel tube. The first end of the second funnel tube may be located closer to the head end of the sliding surface as compared to the second end of the second funnel tube. The second end of the second funnel tube may be located closer to the lateral center of the sliding surface as compared to the first end of the second funnel tube.

In various embodiments, the first end of the first funnel tube may be located between a buckling point of the inflatable tube assembly and the head end of the sliding surface. In various embodiments, the first end of the first funnel tube may be located at a midpoint between the buckling point of the inflatable tube assembly and the head end of the sliding surface.

In various embodiments, the first end of the first funnel tube may be located at a midpoint between a toe end of the sliding surface and the head end of the sliding surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction towards, or generally, closer to the reference component.

Evacuation systems of the present disclosure may include an evacuee-centering evacuation slide. In accordance with various embodiments, a lower inflatable tube of the evacuee-centering evacuation slide may include two funnel tubes, which are angled toward a lateral center of the toe end of the slide. The angled funnel tubes are configured to direct an evacuee away from the sides of the slide and toward the lateral center of the toe end. Locating the evacuees in the center of slide, particularly as the evacuees reach the toe end of the slide, reduces asymmetric loading. Reducing or eliminating asymmetric loading, and thus the amount of buckling load the slide needs to withstand, may allow various reinforcement structures, such as transverse tubes and center tubes located under the sliding surface, to be eliminated.

Figure 1:
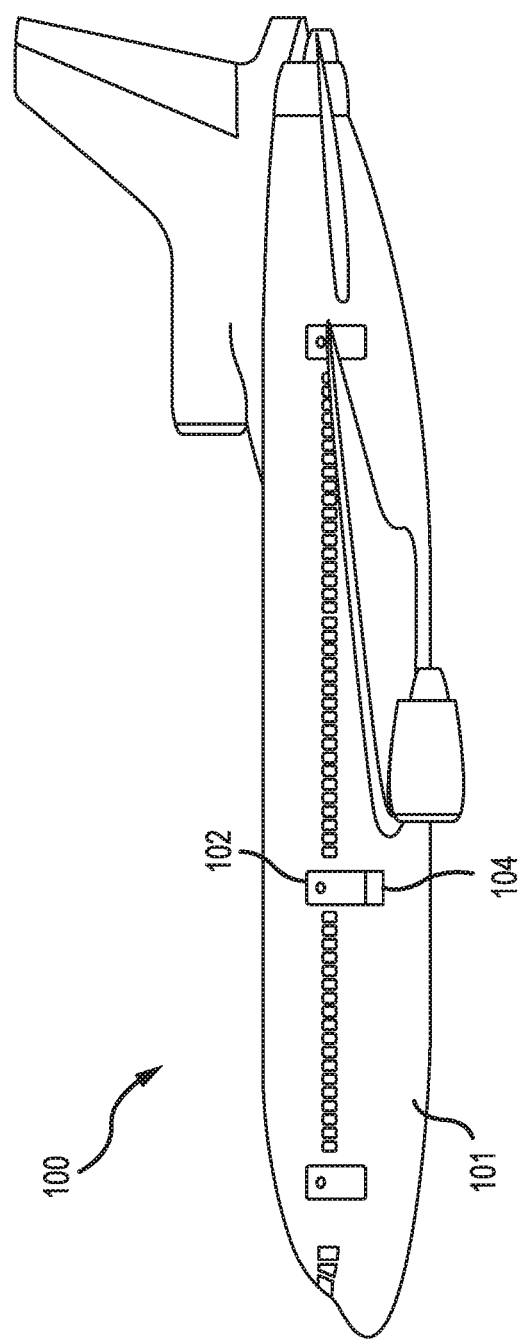
FIG. 1 illustrates an aircraft having an evacuation system, in accordance with various embodiments.

With reference to FIG. 1, an aircraft 100 is shown. Aircraft 100 may include a fuselage 101 having plurality of exit doors, including an exit door 102. Aircraft 100 may include one or more evacuation systems positioned near a corresponding exit door. For example, aircraft 100 includes an evacuation system 104 positioned near exit door 102. In the event of an emergency, exit door 102 may be opened by a passenger or crew member of aircraft 100. Evacuation system 104 may deploy in response to exit door 102 being opened and/or in response to an action taken by a passenger or crew member such as depression of a button, actuation of a lever, or other similar action.

Figure 2:
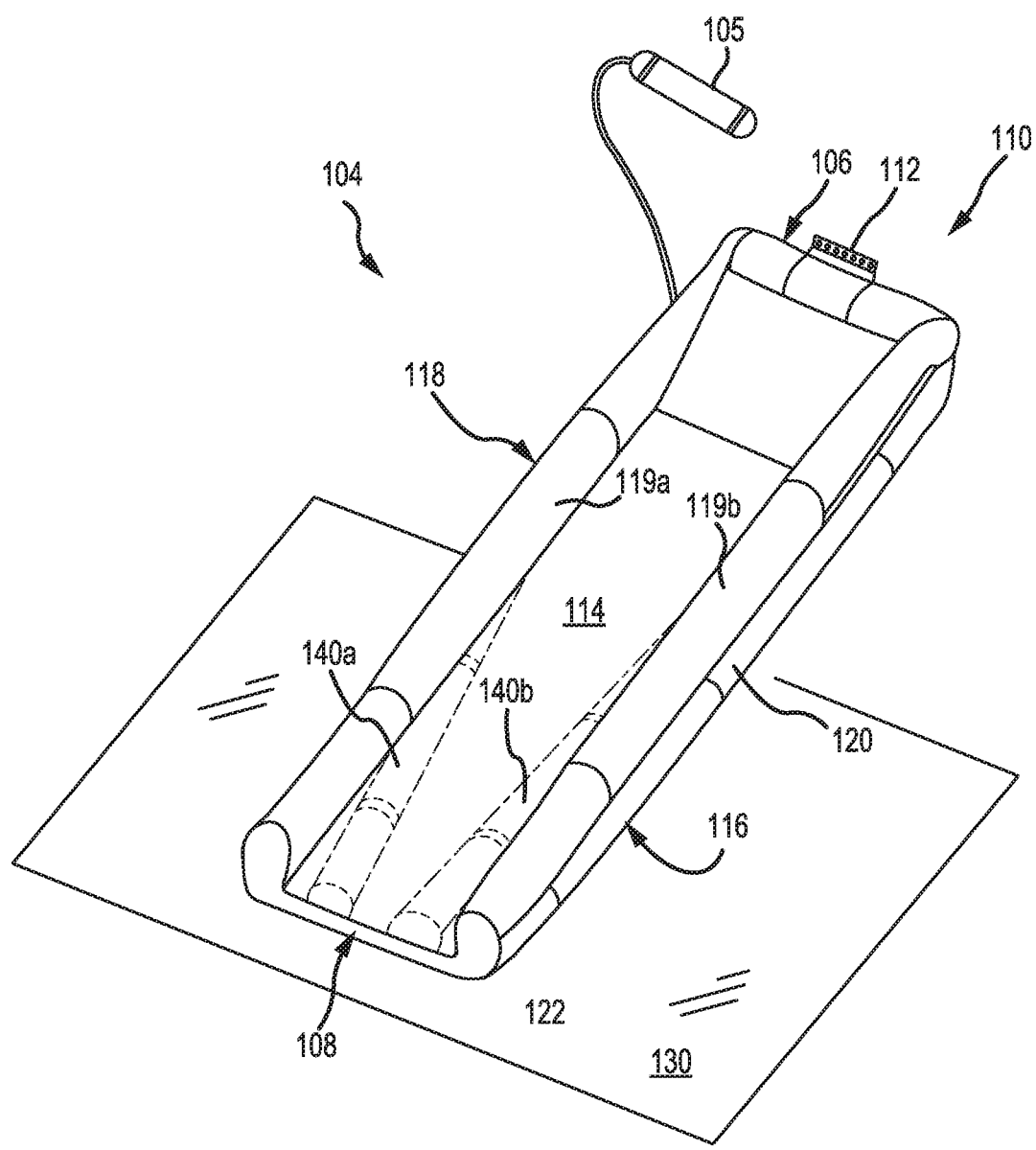
FIG. 2 illustrates a perspective view of an evacuee-centering evacuation slide in a deployed position, in accordance with various embodiments.

With additional reference to FIG. 2, evacuation system 104 is illustrated in a deployed position. In accordance with various embodiments, evacuation system 104 includes an inflatable evacuation slide 110. Evacuation system 104 may further include a compressed fluid source 105. Fluid source 105 is fluidly coupled to evacuation slide 110. Compressed fluid source 105 may be configured to provide a pressurized gas to inflate evacuation slide 110.

Evacuation slide 110 may be deployed from an aircraft, such as aircraft 100. In the event of a water landing, evacuation slide may be deployed as a life raft. In accordance with various embodiments, the width of the exit door 102 from which evacuation slide 110 deploys may be associated with the use of a single lane, rather than a double lane, evacuation slide. In various embodiments, evacuation slide 110 may be a single lane slide. For example, evacuation slide 110 may be formed without (i.e., free of) lane dividers or other structures configured to divide the sliding surface of evacuation slide 110 into multiple sliding lanes.

In accordance with various embodiments, evacuation slide 110 includes a head end 106 and a toe end 108 opposite head end 106. Head end 106 may be coupled to an aircraft structure (e.g., a door sill) via a girt 112. Upon deployment of evacuation slide 110, toe end 108 translates away from the aircraft and door sill and may contact an exit surface 130 (e.g., the ground or water in the case of a water landing).

Evacuation slide 110 includes a sliding surface 114 and an underside surface 116 opposite sliding surface 114. Sliding surface 114 extends from head end 106 to toe end 108 of evacuation slide 110. During an evacuation event, underside surface 116 is oriented generally towards exit surface 130 and sliding surface 114 is oriented generally away from exit surface 130. Evacuation slide 110 includes a first (or upper) inflatable tube assembly 118. First inflatable tube assembly 118 may extend generally around a perimeter of sliding surface 114. First inflatable tube assembly 118 may include a first upper longitudinal tube 119a and a second upper longitudinal tube 119b. First and second upper longitudinal tubes 119a, 119b may each extend between head end 106 and toe end 108 of evacuation slide 110.

In various embodiments, evacuation slide 110 may further include a second (or lower) inflatable tube assembly 120. During an evacuation event, second inflatable tube assembly 120 may be located generally proximate (i.e., closer to) exit surface 130, as compared to first inflatable tube assembly 118. Stated differently, when evacuation slide 110 is in a deployed position, second inflatable tube assembly 120 may be located generally under first inflatable tube assembly 118. First and second inflatable tube assemblies 118, 120 may each comprise generally cylindrically shaped tubes. In various embodiments, first and second inflatable tube assemblies 118, 120 may be in fluid communication. For example, in various embodiments, first inflatable tube assembly 118 and second inflatable tube assembly 120 may be part of one, interconnected chamber that fills with gas in response to deployment of evacuation slide 110.

In accordance with various embodiments, second inflatable tube assembly 120 may include a pair of funnel tubes (e.g., a first funnel tube 140a and a second funnel tube 140b) configured to direct evacuees generally toward a lateral center of evacuation slide 110. As used herein, a "lateral center" of evacuation slide 110 refers to a point on the sliding surface 114 that is midway between (i.e., equal distance from) first upper longitudinal tube 119a and second upper longitudinal tube 119b. First and second funnel tubes 140a, 140b are located opposite and under sliding surface 114 (i.e., on underside surface 116) and are configured to create raised areas along sliding surface 114. In this regard, the portions of sliding surface 114 located on or over first and second funnel tubes 140a, 140b are raised relative to the other portions of sliding surface 114 (i.e., relative to the portions of sliding surface not located on or over first and second funnel tubes 140a, 140b).

Figure 3:
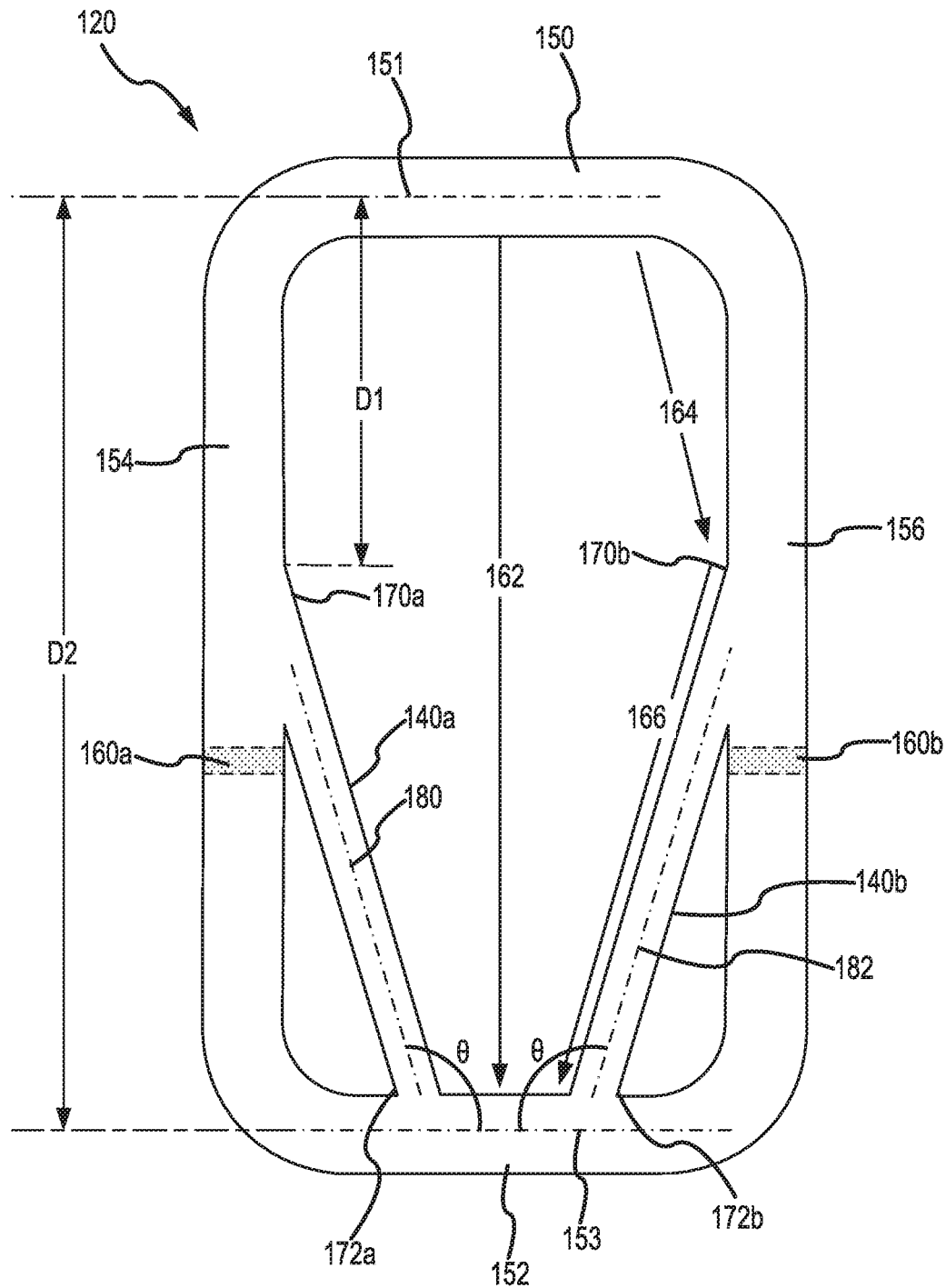
FIG. 3 illustrates a lower tube assembly of an evacuee-centering evacuation slide, in accordance with various embodiments.

With reference to FIG. 3, second inflatable tube assembly 120 is illustrated. In accordance with various embodiments, second inflatable tube assembly 120 includes a head end tube 150, a toe end tube 152, a first lower longitudinal tube 154, and a second lower longitudinal tube 156. Head end tube 150 is located proximate head end 106 of evacuation slide 110 in FIG. 2, and toe end tube 152 is located proximate toe end 108. First and second lower longitudinal tubes 154, 156 extend longitudinally between head end tube 150 and toe end tube 152. In this regard, head end tube 150 and toe end tube 152 extend laterally between first lower longitudinal tube 154 and second lower longitudinal tube 156.

First funnel tube 140a may extend from first lower longitudinal tube 154 to toe end tube 152. Second funnel tube 140b may extend from second lower longitudinal tube 156 to toe end tube 152. In various embodiments, head end tube 150, toe end tube 152, first and second lower longitudinal tubes 154, 156, and first and second funnel tubes 140a, 140b may be in fluid communication. For example, in various embodiments, head end tube 150, toe end tube 152, first and second lower longitudinal tubes 154, 156, and first and second funnel tubes 140a, 140b may be part of one, interconnected chamber that fills with gas in response to deployment of the evacuation slide.

First funnel tube 140a has a head (or first) end 170a and a toe (or second) end 172a located opposite head end 170a. Stated differently, head end 170a is located at a first end of central axis 180 of first funnel tube 140a, and toe end 172a is located at a second, opposite end of central axis 180. Second funnel tube 140b has an upper (or first) end 170b and a toe (or second) end 172b located opposite head end 170b. Stated differently, head end 170b is located at a first end of central axis 182 of second funnel tube 140b, and toe end 172b is located at a second, opposite end of central axis 182.

Head ends 170a, 170b are located closer to head end tube 150 (and head end 106 in FIG. 2) as compared to toe ends 172a, 172b. Toe ends 172a, 172b are located closer to the lateral center of the sliding surface, as compared to head ends 170a, 170b. Head end 170a may be connected to first lower longitudinal tube 154. Head end 170b may be connected to second lower longitudinal tube 156. The head end 170a of first funnel tube 140a is an open end of the funnel tube that is connected to first lower longitudinal tube 154 and defined by the first funnel tube 140a. An orifice defined by first lower longitudinal tube 154 may fluidly connect first funnel tube 140a and first lower longitudinal tube 154. The head end 170b of second funnel tube 140b is an open end of the funnel tube connected to second lower longitudinal tube 156 and defined by the second funnel tube 140b. An orifice defined by second lower longitudinal tube 156 may fluidly connect second funnel tube 140b and second lower longitudinal tube 156. Toe ends 172a, 172b are located proximate and may be connected to toe end tube 152. In various embodiments, toe ends 172a, 172b may each define an orifice that fluidly connects the respective funnel tube to toe end tube 152.

In various embodiments, first and second funnel tubes 140a, 140b are oriented at an angle theta ($\theta$) relative to toe end tube 152. Angle theta ($\theta$) of first funnel tube 140a is measured between central axis 180 of first funnel tube 140a and central axis 153 of toe end tube 152. Angle theta ($\theta$) of second funnel tube 140b is measured between central axis 182 of second funnel tube 140b and central axis 153 of toe end tube 152. Angles theta ($\theta$) are selected such first and second funnel tubes 140a, 140b begin directing evacuees toward the lateral center of the slide prior to the evacuee reaching the buckling (or weakest) point in first and second lower longitudinal tubes 154, 156. For example, arrow 162 shows the path of an evacuee sliding down the lateral center of the slide. An evacuee traveling down the lateral center generates a minimal or lesser load on first and second lower longitudinal tubes 154, 156 as compared to an evacuee sliding closer to either first lower longitudinal tube 154 or second lower longitudinal tube 156.

Arrow 164 shows the path of an evacuee traveling asymmetrically toward second lower longitudinal tube 156. As the evacuee reaches head end 170b of second funnel tube 140b, the evacuee is directed along the path of arrow 166, toward the lateral center of the slide. The location of the head end 170a of first funnel tube 140a and the head end 170b of second funnel tube 140b are selected such that an evacuee will reach head ends 170a, 170b prior to reaching the buckling points 160a, 160b of first and second lower longitudinal tubes 154, 156, respectively. The buckling point 160a is the weakest point of first lower longitudinal tube 154. The buckling point 160b is the weakest point of second lower longitudinal tube 156. Stated differently, first and second lower longitudinal tubes 154, 156 are most likely to buckle when a load (e.g., an evacuee) is located at buckling points 160a, 160b. For example, in various embodiment, buckling points 160a, 160b may be approximately midway between head end tube 150 and toe end tube 152. It should be appreciated that the buckling point is dependent on the design (e.g., the diameter, width, length, reinforcements, etc.) of the evacuation slide. In this regard, the angle theta ($\theta$) and length of first and second funnel tubes 140a, 140b are selected to minimize the length of first and second funnel tubes 140a, 140b, while locating head ends 170a, 170b above buckling points 160a, 160b (i.e., head ends 170a, 170b are located between buckling points 160a, 160b and head end tube 150). Stated differently, a distance between head end 170a of first funnel tube 140a and head end tube 150 is less than the distance between buckling point 160a of first lower longitudinal tube 154 and head end tube 150, and a distance between head end 170b of second funnel tube 140b and head end tube 150 is less than the distance between the buckling point 160b of second lower longitudinal tube 156 and head end tube 150.

In various embodiments, a distance D1 between head ends 170a, 170b of first and second funnel tubes 140a, 140b and head end tube 150 is between 15% and 70% of a total distance D2 between head end tube 150 and toe end tube 152. In various embodiments, distance D1 is between 25% and 50% of distance D2. In various embodiments, distance D1 is between 33% and 40% of distance D2. Distance D1 is measured between the point of head ends 170a, 170b that is closest to head end tube 150 and central axis 151 of head end tube 150. Distance D2 is measured between central axis 151 of head end tube 150 and central axis 153 of toe end tube 152.

Figure 4:
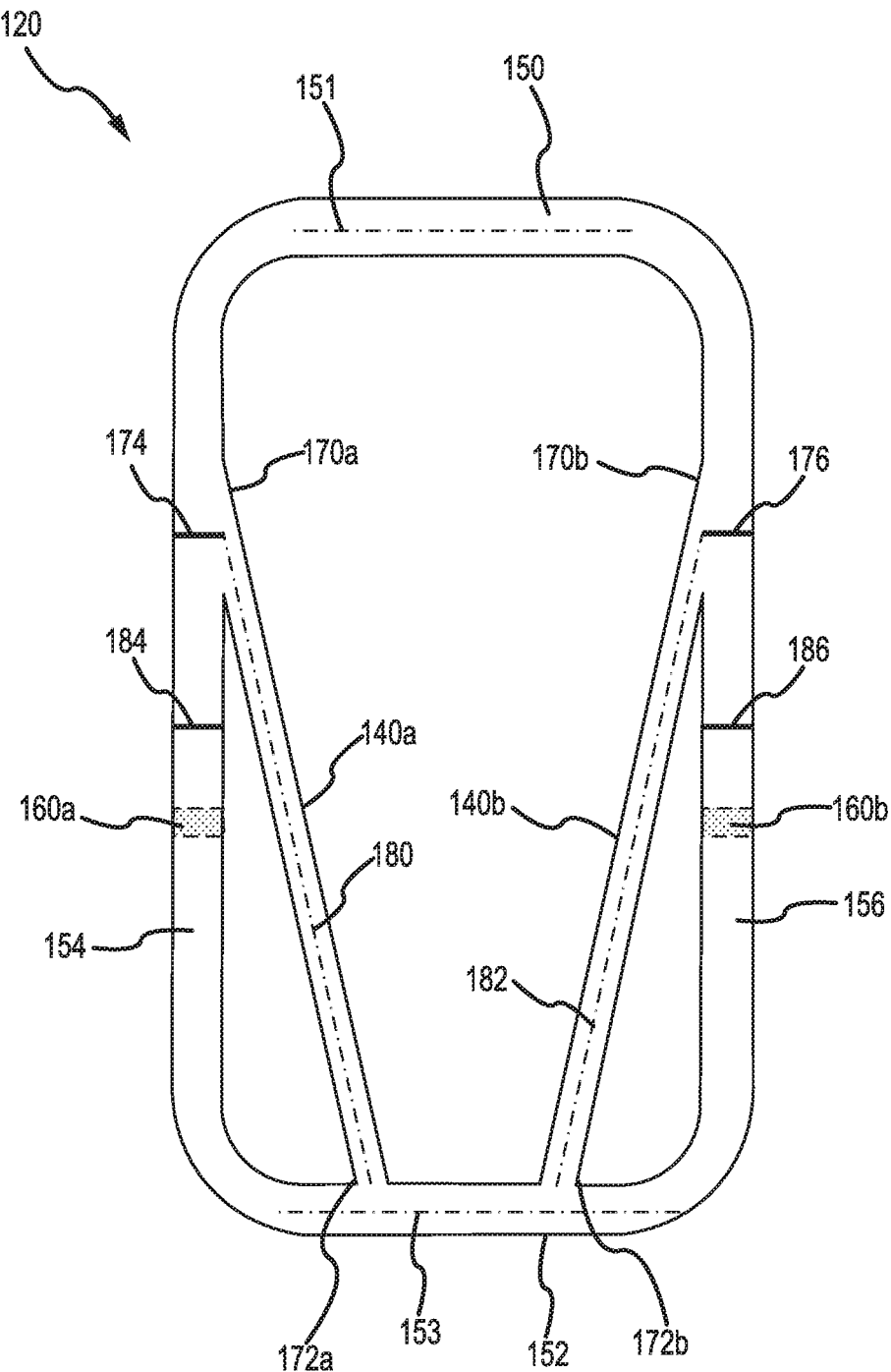
FIG. 4 illustrates a lower tube assembly of an evacuee-centering evacuation slide, in accordance with various embodiments.

In various embodiments, and with reference to FIG. 4, head end 170a of first funnel tube 140a is located at a midpoint 174 between the buckling point 160a of first lower longitudinal tube 154 and head end tube 150. For example, central axis 180 at head end 170a of first funnel tube 140a is located at midpoint 174. Midpoint 174 is a point on first lower longitudinal tube 154 that is equal distance from (i.e., halfway between) the buckling point 160a of first lower longitudinal tube 154 and central axis 151 of the head end tube 150. In various embodiments, head end 170b of second funnel tube 140b is located at a midpoint 176 between the buckling point 160b of second lower longitudinal tube 156 and head end tube 150. For example, central axis 182 at head end 170b of second funnel tube 140b is located at midpoint 176. Midpoint 176 is a point on second lower longitudinal tube 156 that is equal distance from (i.e., halfway between) the buckling point 160b of second lower longitudinal tube 156 and central axis 151 of the head end tube 150.

In various embodiments, head end 170a of first funnel tube 140a is located between a midpoint 184 of first lower longitudinal tube 154 and head end tube 150. For example, central axis 180 at head end 170a of first funnel tube 140a is located between midpoint 184 and head end tube 150. In various embodiments, central axis 180 at head end 170a may be equal distance from midpoint 184 and central axis 151 of head end tube 150. In various embodiments, central axis 180 at head end 170a may be located closer to midpoint 184 than to central axis 151 of head end tube 150. Midpoint 184 is a point on first lower longitudinal tube 154 that is equal distance from (i.e., halfway between) central axis 151 of the head end tube 150 and central axis 153 of toe end tube 152.

In various embodiments, head end 170b of second funnel tube 140b is located between a midpoint 186 of second lower longitudinal tube 156 and head end tube 150. For example, central axis 182 at head end 170b of second funnel tube 140b is located between midpoint 186 and head end tube 150. In various embodiments, central axis 182 at head end 170b may be equal distance from midpoint 186 and central axis 151 of head end tube 150. In various embodiments, central axis 182 at head end 170b may be located closer to midpoint 186 than to central axis 151 of head end tube 150. Midpoint 186 is a point on second lower longitudinal tube 156 that is equal distance from (i.e., halfway between) central axis 151 of the head end tube 150 and central axis 153 of toe end tube 152.

Figure 5A:
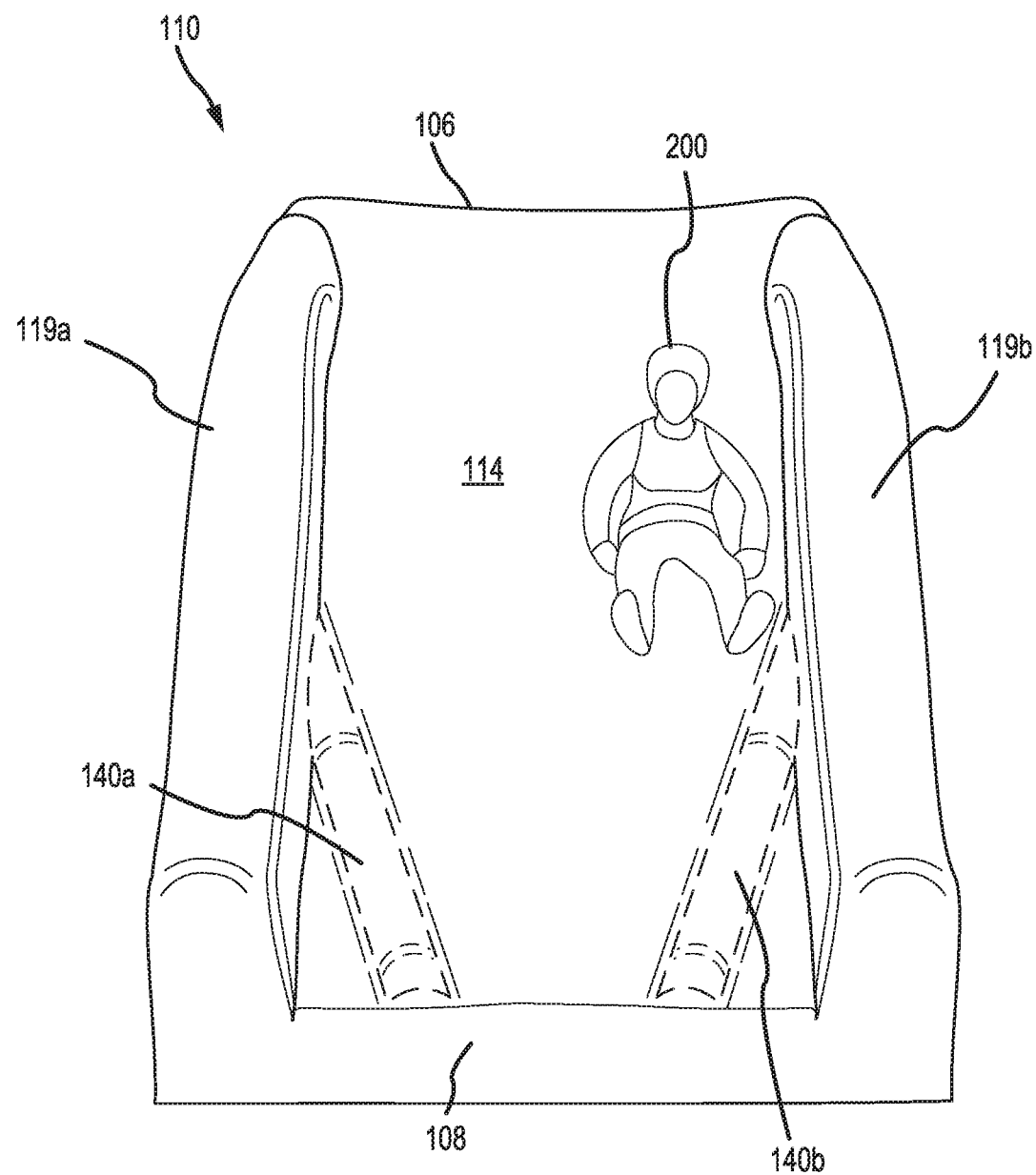
FIGS. 5A and 5B illustrate an evacuee sliding down an evacuee-centering evacuation slide, in accordance with various embodiments.
Figure 5B:
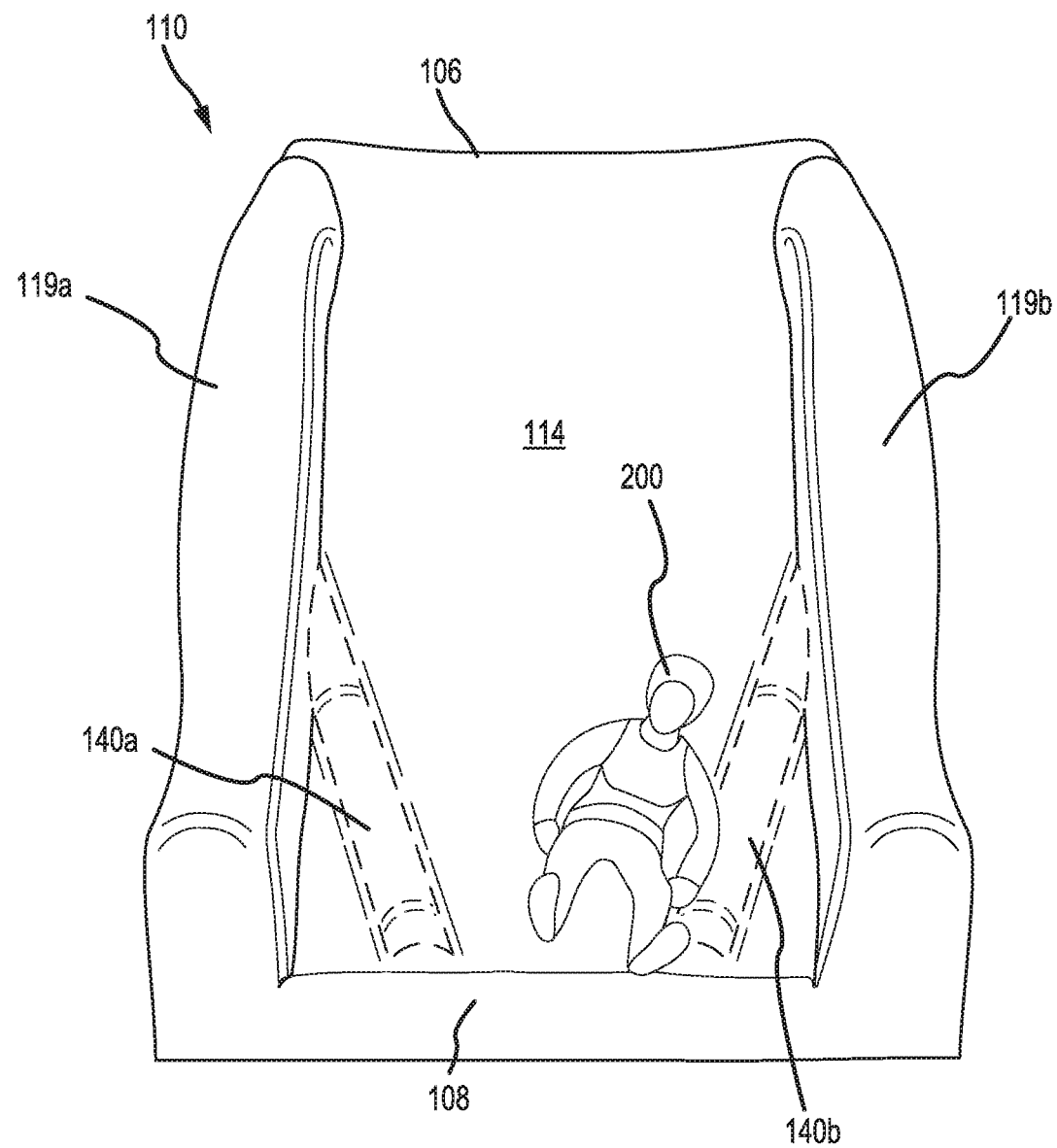

With reference to FIGS. 5A and 5B, an evacuee 200 sliding down evacuation slide 110 is illustrated. Evacuee 200 enters sliding surface 114 at head end 106. Evacuee 200 travels along sliding surface 114 asymmetrically such that evacuee 200 is located closer to second upper longitudinal tube 119b. In response to evacuee 200 reaching the raised portion of sliding surface 114 located along second funnel tube 140b, evacuee 200 begins traveling toward the lateral center of the evacuation slide 110. In this regard, second funnel tube 140b directs evacuee 200 away from second upper longitudinal tube 119b as evacuee slides toward toe end 108. Directing evacuee 200 toward the lateral center reduces the load on second upper longitudinal tube 119b. First and second funnel tubes 140a, 140b tend to reduce asymmetric loading at or near the buckling point of the slide, thereby decreasing the need for reinforcements structures (e.g., tubes traversing between first lower longitudinal tube 154 and second lower longitudinal tube 156). Reducing asymmetric loading may also allow evacuation slide 110 to employ first and second lower longitudinal tubes 154, 156 of decreased diameter. Eliminating or decreasing the number of reinforcements structures and/or reducing inflatable tube diameter, tends to reduce the weight of the evacuation slide and/or decrease the volume and cost of materials used to form the slide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
a first inflatable tube assembly including a first upper longitudinal tube and a second upper longitudinal tube; and
a second inflatable tube assembly adjacent to the first inflatable tube assembly and including:
a first lower longitudinal tube;
a second lower longitudinal tube;
a head end tube;
a toe end tube extending between the first lower longitudinal tube and the second lower longitudinal tube;
a first funnel tube extending from the first lower longitudinal tube to the toe end tube, wherein a first end of the first funnel tube is connected to the first lower longitudinal tube and a second end of the first funnel tube is connected to the toe end tube, the second end of the first funnel tube being located closer to a lateral center of a sliding surface of the evacuation slide as compared to the first end of the first funnel tube; and
a second funnel tube extending from the second lower longitudinal tube to the toe end tube, wherein a first end of the second funnel tube is connected to the second lower longitudinal tube and a second end of the second funnel tube is connected to the toe end tube, the second of the second funnel tube being located closer to the lateral center of the sliding surface as compared to the first end of the second funnel tube.

2. The evacuation slide of claim 1, wherein the first end of the first funnel tube is located closer to the head end tube than to the toe end tube.

3. The evacuation slide of claim 1, wherein the first end of the first funnel tube is between a buckling point of the first lower longitudinal tube and the head end tube.

4. The evacuation slide of claim 3, wherein the first end of the first funnel tube is located at a midpoint between the buckling point of the first lower longitudinal tube and the head end tube.

5. The evacuation slide of claim 1, wherein the first funnel tube and the second funnel tube are configured to create raised areas in the sliding surface.

6. An evacuation system, comprising:
a fluid source; and
an evacuation slide fluidly coupled to the fluid source and comprising:
a first inflatable tube assembly fluidly coupled to the fluid source, the first inflatable tube assembly including a first upper longitudinal tube and a second upper longitudinal tube; and
a second inflatable tube assembly fluidly coupled to the fluid source and including:
a first lower longitudinal tube;
a second lower longitudinal tube;
a head end tube;
a toe end tube;
a first funnel tube extending from the first lower longitudinal tube to the toe end tube, wherein a first end of the first funnel tube is connected to the first lower longitudinal tube and a second end of the first funnel tube is located closer to a lateral center of a sliding surface of the evacuation slide as compared to the first end of the first funnel tube; and
a second funnel tube extending from the second lower longitudinal tube to the toe end tube, wherein a first end of the second funnel tube is connected to the second lower longitudinal tube and a second end of the second funnel tube is located closer to the lateral center of the sliding surface as compared to the first end of the second funnel tube.

7. The evacuation system of claim 6, wherein the first end of the first funnel tube is located between a first buckling point of the first lower longitudinal tube and the head end tube, and wherein the first end of the second funnel tube is located between a second buckling point of the second lower longitudinal tube and the head end tube.

8. The evacuation system of claim 7, wherein the first end of the first funnel tube is located at a midpoint between the first buckling point of the first lower longitudinal tube and the head end tube, and wherein the first end of the second funnel tube is located at a midpoint between the second buckling point of the second lower longitudinal tube and the head end tube.

9. The evacuation system of claim 6, wherein the first end of the first funnel tube is located between a midpoint of the first lower longitudinal tube and the head end tube, the midpoint of the first lower longitudinal tube being halfway between the head end tube and the toe end tube, and wherein the first end of the second funnel tube is located between a midpoint of the second lower longitudinal tube and the head end tube, the midpoint of the second lower longitudinal tube being halfway between the head end tube and the toe end tube.

10. The evacuation system of claim 6, wherein a first portion of the sliding surface located over the first funnel tube and a second portion of the sliding surface located over the second funnel tube are raised with respect to a portion of the sliding surface located at the lateral center of the sliding surface.

11. An evacuation slide, comprising:
a sliding surface; and
an inflatable tube assembly configured to direct an evacuee toward a lateral center of the sliding surface, the inflatable tube assembly including:
a first longitudinal tube;
a second longitudinal tube;
a toe end tube extending between the first longitudinal tube and the second longitudinal tube;
a first funnel tube extending from the first longitudinal tube to the toe end tube, wherein a first end of the first funnel tube is connected to the first longitudinal tube and a second end of the first funnel tube is connected to the toe end tube, the second end of the first funnel tube being located closer to the lateral center of the sliding surface as compared to the first end of the first funnel tube; and a second funnel tube extending from the second longitudinal tube to the toe end tube, wherein a first end of the second funnel tube is connected to the second longitudinal tube and a second end of the second funnel tube is connected to the toe end tube, the second of the second funnel tube being located closer to the lateral center of the sliding surface as compared to the first end of the second funnel tube.

12. The evacuation slide of claim 11, wherein the first end of the first funnel tube is located closer to a head end of the sliding surface as compared to the second end of the first funnel tube.

13. The evacuation slide of claim 12, wherein the first end of the second funnel tube is located closer to the head end of the sliding surface as compared to the second end of the second funnel tube.

14. The evacuation slide of claim 13, wherein the first end of the first funnel tube is located between a buckling point of the inflatable tube assembly and the head end of the sliding surface.

15. The evacuation slide of claim 14, wherein the first end of the first funnel tube is located at a midpoint between the buckling point of the inflatable tube assembly and the head end of the sliding surface.

16. The evacuation slide of claim 13, wherein the first end of the first funnel tube is located between a midpoint of the sliding surface and the head end of the sliding surface, the midpoint of the sliding surface being equal distance from the head end of the sliding surface and a toe end of the sliding surface.

* * * * *